Figure 1:
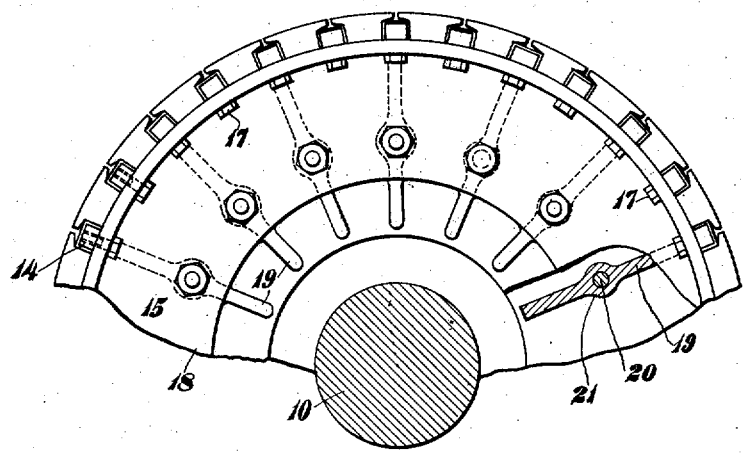

No. 872,708.

PATENTED DEC. 3, 1907.

B. A. BEHREND.
INDUCTION MOTOR.
APPLICATION FILED AUG. 31, 1906.

WITNESSES
Oliver W Sharman
Fred J. Kinsey

INVENTOR
Bernard A. Behrend
BY
Chas. E. Lord
ATTORNEY

UNITED STATES PATENT OFFICE.

BERNARD A. BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

INDUCTION-MOTOR.

No. 872,708.      Specification of Letters Patent.      Patented Dec. 3, 1907.

Application filed August 31, 1906. Serial No. 332,772.

*To all whom it may concern:*

Be it known that I, BERNARD A. BEHREND, citizen of the United States, residing at Norwood, in the county of Hamilton and State of Ohio, have invented certain new and useful Improvements in Induction-Motors, of which the following is a full, clear, and exact specification.

My invention relates to induction motors and particularly to the large rotary members, or rotors of the squirrel-cage type, intended for high speeds of rotation.

In induction motors of ordinary sizes and speeds the construction and weight of the rotary members or rotors are very important. In such machines the cores of the rotors are made up of punched laminæ which are held between cast iron end plates the whole being clamped together by long bolts. In rotors of the squirrel-cage type the windings consist of conductor bars and short-circuiting rings the latter being usually seated on ribs or brackets integral with the spider. The parts of the rotor and stator are cooled by the fan-like action of the rotor the ends of the machines being usually provided with some form of ventilating members. In some machines the brackets on which the rings rest serve as fan-blades, and in others special fan-blades are mounted on the ends of the rotor.

In large machines, the rotors of which are designed for very high peripheral speeds, it is quite essential that the rotors be made very strong and compact. At the same time the structures must be carefully designed and all unnecessary parts dispensed with so that they are as light as is consistent with strength and durability.

The capacity of a motor is sometimes limited by the high rise of temperature in the rotor and stator. In the machines heretofore constructed, the ventilation has not been in all cases satisfactory for the reason that sufficient air currents can not be generated or a sufficient volume of air can not be directed against the parts necessary to be cooled. In some machines this difficulty is due to the fact that the ventilating members are not sufficiently near the periphery of the rotor while in others it is due to the fact that the air currents are prevented from reaching the desired parts on account of the interference of overhanging parts of the rotor, particularly the short-circuiting rings. Therefore, to obtain the maximum capacity from the motors, it is necessary that the rotary members be so designed and constructed as to obtain the maximum cooling effects when in rotation.

One of the objects of my invention is to provide a rotary member for induction motors which consists of few parts, is simple in construction, and compact, and designed so as to readily withstand the strains due to centrifugal action.

A further object is to provide a rotary member for large induction motors which is so constructed that, when rotated, sufficient draft of air is created, and directed against the parts of the rotor and stator, to prevent a high rise of temperature.

My invention consists in the details of construction and in the combinations and arrangements of parts described in the specification and set forth in the appended claims.

Figure 2:
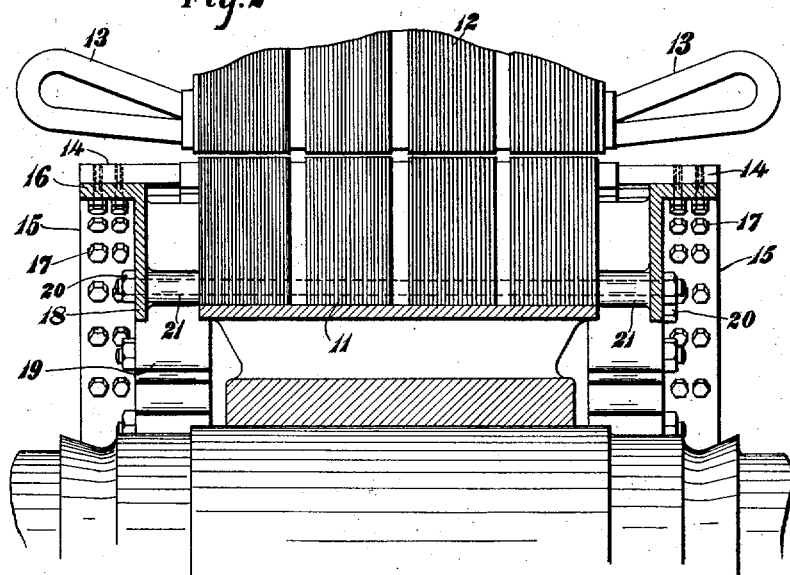
Figure 3:
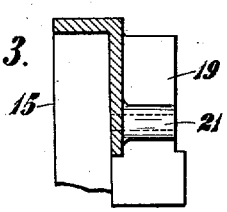

For a better understanding of my invention reference is had to the accompanying drawing in which Figure 1 is a partial end elevation of a squirrel cage rotor equipped with my invention, parts being broken away; Fig. 2 is a partial longitudinal section of the stator and rotor; and Fig. 3 is a sectional view of one of the end members employed in my invention.

Referring now to the figures of the drawing; I have shown at 10 the rotary shaft on which is mounted the slotted core 11 consisting of groups of laminæ. The core 11 is adapted to rotate at high speed within the stator core 12 which carries the stator winding 13. Located in the slots of the rotor core are the usual conductor bars 14 the ends of which extend beyond the ends of the core. At 15 are shown end members which serve as short-circuiting means for the conductor bars, as end clamping heads for the laminæ of the core, and as ventilating members for creating air currents to cool the rotor and stator. In this instance the end members 15 consist of rings, each having a cylindrical portion 16, to which the ends of the conductors are secured by bolts or rivets 17, and a portion 18 at right angles to the cylindrical portion 16 and as here shown parallel with the laminæ of the core.

Integral with the portions 18 of the rings are a plurality of radial ribs or blades 19 which extend inward and bear against the outer laminæ at the ends of the rotor. The rings or end members and laminæ of the core are clamped tightly together by long axial or longitudinal bolts, rods, or rivets, 20 which in this case pass through enlarged portions 21 of the radial ribs 19.

Thus it is seen that I have provided a structure which consists of fewer parts than the structures heretofore employed and which is very compact and able to withstand the stresses due to centrifugal action. Furthermore, the radial blades 19 are located in the most advantageous position for cooling the rotor and stator since they are near the conductor bars, in contact with the laminæ, and between the laminæ and portions 18 of the rings. These portions 18 can in no manner interfere with the circulation of air, instead, they tend to guide the air outward.

If desired the rings may be built of a plurality of sections.

I do not wish to be confined to the exact details shown but aim in my claims to cover all modifications which do not involve a departure from the spirit and scope of my invention.

What I claim as new and desire to secure by Letters Patent is:—

1. In a rotor, a laminated core, conductors located in said core, short circuiting rings for said conductors, said rings having integral fan blades extending therefrom toward and into engagement with the end laminæ of the core, and means for clamping the rings and laminæ together.

2. In a rotor for induction motors, a slotted laminated core, conductor bars located in the slots of the core, short-circuiting rings for said bars, said rings having substantially radial ribs in engagement with the end laminæ of the core, and bolts or rods for clamping the core and rings together.

3. In a rotor for induction motors, a slotted laminated core, conductor bars located in the slots of the core, and combined short-circuiting rings and end-heads clamped to each side of the core, said combined short-circuiting rings and end-heads formed with a portion located in a plane parallel to the laminæ of the core and having radial ribs which act as fan-blades the fan-blades being located between said parallel portion and the core.

4. In a rotor for induction motors, a slotted core, conductor bars located in the slots of the core, combined short-circuiting rings and end-heads clamped to the laminæ, and radial ribs serving as fan-blades on the inner sides of the rings and engaging the end laminæ.

5. In a squirrel-cage rotor of an induction motor, a slotted core, conductor bars located in the slots of the core, short-circuiting rings for the ends of the conductors, said rings having radial ribs or blades engaging the end laminæ, and bolts or rods passing through the radial ribs or blades and laminæ for clamping the parts tightly together, whereby said rings serve also as end-heads for the laminæ and as ventilating members.

In testimony whereof I affix my signature, in the presence of two witnesses.

BERNARD A. BEHREND.

Witnesses:
LAURA E. WEBB,
LAURA E. WELCH.